(12) United States Patent
Lambert et al.

(10) Patent No.: US 8,400,261 B2
(45) Date of Patent: Mar. 19, 2013

(54) INTERACTIVE PHONE MESSAGE CONTROL APPARATUS FOR A MOTOR VEHICLE

(75) Inventors: David K. Lambert, Sterling Heights, MI (US); Michel F. Sultan, Troy, MI (US); Laci J. Jalics, Ray, MI (US); Francis E. Szczublewski, Macomb, MI (US)

(73) Assignee: Delphi Technologies, Inc., Troy, MI (US)

( * ) Notice: Subject to any disclaimer, the term of this patent is extended or adjusted under 35 U.S.C. 154(b) by 480 days.

(21) Appl. No.: 12/732,323

(22) Filed: Mar. 26, 2010

(65) Prior Publication Data

US 2011/0234372 A1  Sep. 29, 2011

(51) Int. Cl.
*G05B 19/00* (2006.01)
*G06F 7/00* (2006.01)
*G06K 19/00* (2006.01)
*G08B 29/00* (2006.01)

(52) U.S. Cl. ....... 340/5.54; 340/439; 340/468; 340/438; 345/204

(58) Field of Classification Search .............. 340/5.54, 340/425.5, 439, 468, 438; 345/204; 701/1; 455/557, 345, 569.2
See application file for complete search history.

(56) References Cited

U.S. PATENT DOCUMENTS

| 5,537,967 A * | 7/1996 | Tashiro et al. ............. 123/192.1 |
| 5,903,454 A | 5/1999 | Hoffberg et al. |
| 6,262,657 B1 * | 7/2001 | Okuda et al. .................. 340/439 |
| 6,353,778 B1 * | 3/2002 | Brown ............................ 701/1 |
| 7,136,710 B1 | 11/2006 | Hoffberg et al. |
| 7,242,988 B1 | 7/2007 | Hoffberg et al. |
| 7,463,961 B2 * | 12/2008 | Powers et al. ................... 701/36 |
| 7,505,784 B2 * | 3/2009 | Barbera ....................... 455/557 |
| 7,541,914 B2 * | 6/2009 | Breiner ...................... 340/425.5 |
| 7,650,319 B2 | 1/2010 | Hoffberg et al. |
| 7,957,773 B2 * | 6/2011 | Chua et al. ................. 455/569.2 |
| 8,212,661 B2 * | 7/2012 | Shuster ........................ 340/438 |

FOREIGN PATENT DOCUMENTS

EP  1 512 584  3/2005

\* cited by examiner

*Primary Examiner* — Nam V Nguyen
(74) *Attorney, Agent, or Firm* — Lawrence D. Hazelton

(57) ABSTRACT

A motor vehicle includes control apparatus for establishing an interactive human-machine interface (HMI) between a vehicle driver and an on-board communication system that is wirelessly coupled to a nomadic communication device carried by the driver. The on-board communication system has the ability to activate the nomadic communication device to check for messages, and the interactive HMI includes a configurable display through which check-message inquiries are selectively communicated to the driver, and an input device selectively manipulated by the driver to accept a check-message inquiry. An HMI controller responsive to sensed vehicle operating condition data and driver manipulation of the input device determines if and when a check-message inquiry should be communicated to the driver.

18 Claims, 2 Drawing Sheets

INTERACTIVE PHONE MESSAGE CONTROL APPARATUS FOR A MOTOR VEHICLE

TECHNICAL FIELD

The present invention relates to an interactive human-machine interface (HMI) for use in a motor vehicle, and more particularly to an interactive nomadic phone message control apparatus that selectively presents check-message opportunities to the driver of the motor vehicle when consistent with safe operation of the vehicle.

BACKGROUND OF THE INVENTION

It is widely recognized that there are serious traffic accident risks associated with nomadic phone usage by motor vehicle drivers at times when the full attention of the driver should be directed to the driving task, and vehicle manufacturers have begun equipping certain vehicles with on-board communication systems that simplify or automate nomadic phone usage and thereby mitigate some of the safety concerns. In a typical installation, the communication system is wirelessly coupled to the driver's nomadic phone, and forms a human-machine interface (HMI) for enabling hands-free phone usage while the driver is operating the vehicle. However, it can be difficult and/or inconvenient to implement certain nomadic phone functions such as message checking without significantly distracting the driver. Also, it is desirable to encourage drivers to only interact with nomadic devices when consistent with safe operation of the vehicle. Accordingly, what is needed is an interactive HMI that allows the driver to selectively listen to nomadic phone messages without introducing any significant driver distraction or safety concerns.

Of course, interactive HMIs are generally known in the art, and have been used to simplify and streamline the operation and programming of complex consumer electronic devices such as personal computers and entertainment systems. For example, the U.S. Pat. No. 5,903,454 to Hoffberg et al. discloses a programmable video cassette recorder having an interactive display device for presenting prompts or possible choices to the user, and receiving user input (accept/reject, for example) responsive to the presented prompt or choice. As also disclosed by Hoffberg et al., the inputs elicited from a given user can be used to construct a preference matrix, which then influences future prompts or choices presented to a given user.

SUMMARY OF THE INVENTION

The present invention is directed to an interactive HMI between a vehicle driver and an on-board communication system that is wirelessly coupled to a nomadic communication device carried by the driver. The communication system has the ability to activate the nomadic communication device to check for messages, and the interactive HMI includes a configurable display through which check-message inquiries are selectively communicated to the driver and an input device selectively manipulated by the driver to accept a check-message inquiry. An HMI-controller responsive to sensed vehicle operating condition data and driver manipulation of the input device determines if and when a check-message inquiry should be communicated to the driver.

DESCRIPTION OF THE PREFERRED EMBODIMENT

Figure 1:
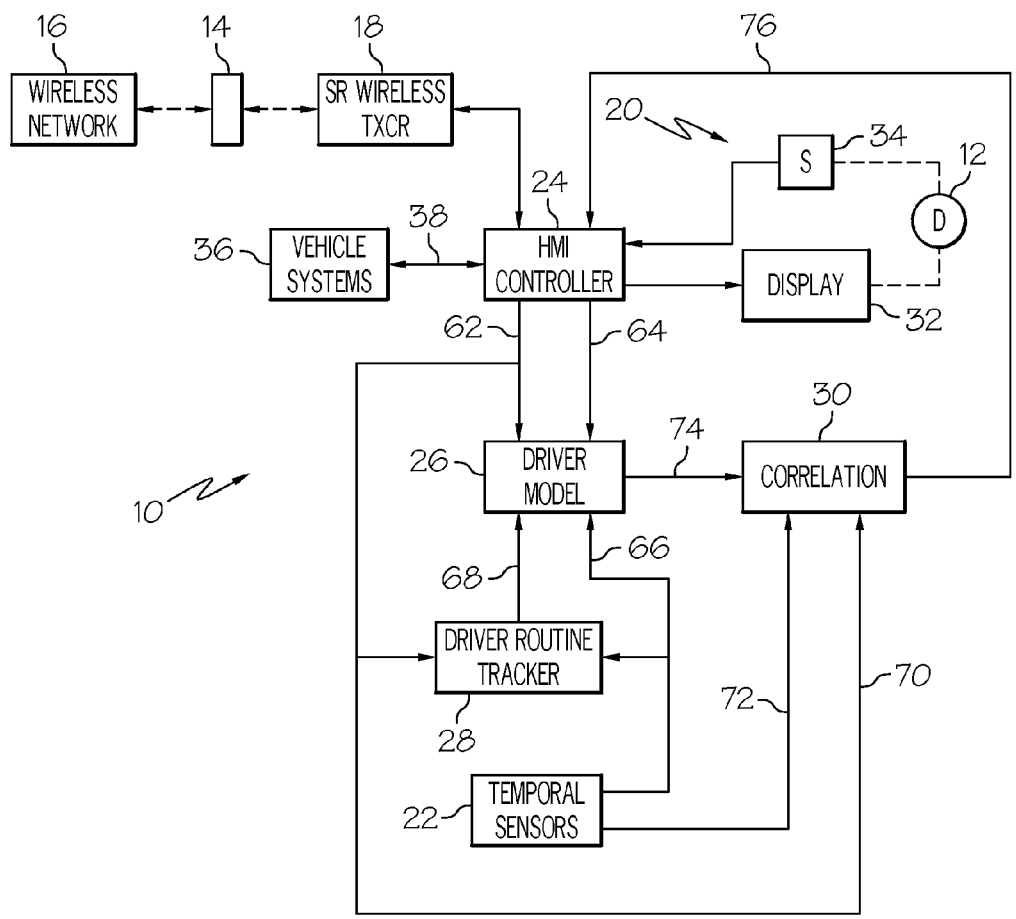
FIG. 1 is a block diagram of a motor vehicle interactive phone message control apparatus according to this invention, including a microprocessor-based HMI-controller for determining if and when check-message inquiries should be communicated to the driver of the vehicle.

Referring to the drawings, and particularly to FIG. 1, the reference numeral 10 generally designates an interactive phone message control apparatus as installed in a motor vehicle. The vehicle driver (D) 12 possesses a nomadic communication device 14 such as a cellular phone or PDA that wirelessly communicates with an external communication network 16 such as a cellular network, and the nomadic communication device 14 is paired to an on-board short-range wireless transceiver 18 such as a Bluetooth or wi-fi transceiver, or an IrDA link. The apparatus 10 includes an HMI 20, a set of temporal sensors 22, a microprocessor-based HMI-controller 24, and a set of functional blocks 26, 28, 30 pertaining to driver profiling. The HMI 20 includes a reconfigurable display 32 activated by HMI-controller 24 to selectively present check-message inquiries to the driver 12, and an input device 34 such as a switch (or touch sensor on display 32) selectively manipulated by the driver 12 to accept a check-message inquiry.

The HMI-controller 24 is linked to various on-board vehicle control systems 36 via a bi-directional communication bus 38 for the purpose of acquiring vehicle operating condition data and determining, in view of the data, if it is appropriate to present a check-message inquiry to driver 12 via display 32. For example, it may be appropriate to present a check-message inquiry to the driver 12 prior to vehicle movement, or while the vehicle is stopped in traffic for a prolonged period. If the driver 12 accepts the inquiry via input device 34, the HMI-controller 24 acquires the messages from the nomadic communication device 14 and presents them to driver 12, by either voice (using the vehicle audio system, for example) or text (using reconfigurable display 32).

The functional blocks 26, 28, 30 illustrate a way of taking into account other considerations pertinent to the determination of whether to present a check-message inquiry to the driver 12. These considerations involve correlating driver responses (via input device 34) over a prolonged period with various conditions (temporal and otherwise) present at the time of the responses, and using the collected information along with current conditions to predict whether the driver 12 will welcome a check-message opportunity. Put another way, the blocks 26, 28, 30 essentially develop a profile of the driver 12, as pertains to receptivity to check-message inquiries, and the HMI-controller 24 will only present a check-message inquiry to driver 12 if the vehicle operating conditions are appropriate and the driver's past actions under conditions similar to the current conditions indicate a willingness to listen to messages. Of course, this assumes that the apparatus 10 is capable of distinguishing among various possible drivers so that profile data for one driver is not influenced by the actions of a different driver. And various generally known means exist for distinguishing among drivers, including key fob identification, nomadic phone identification, and so forth.

Figure 2:
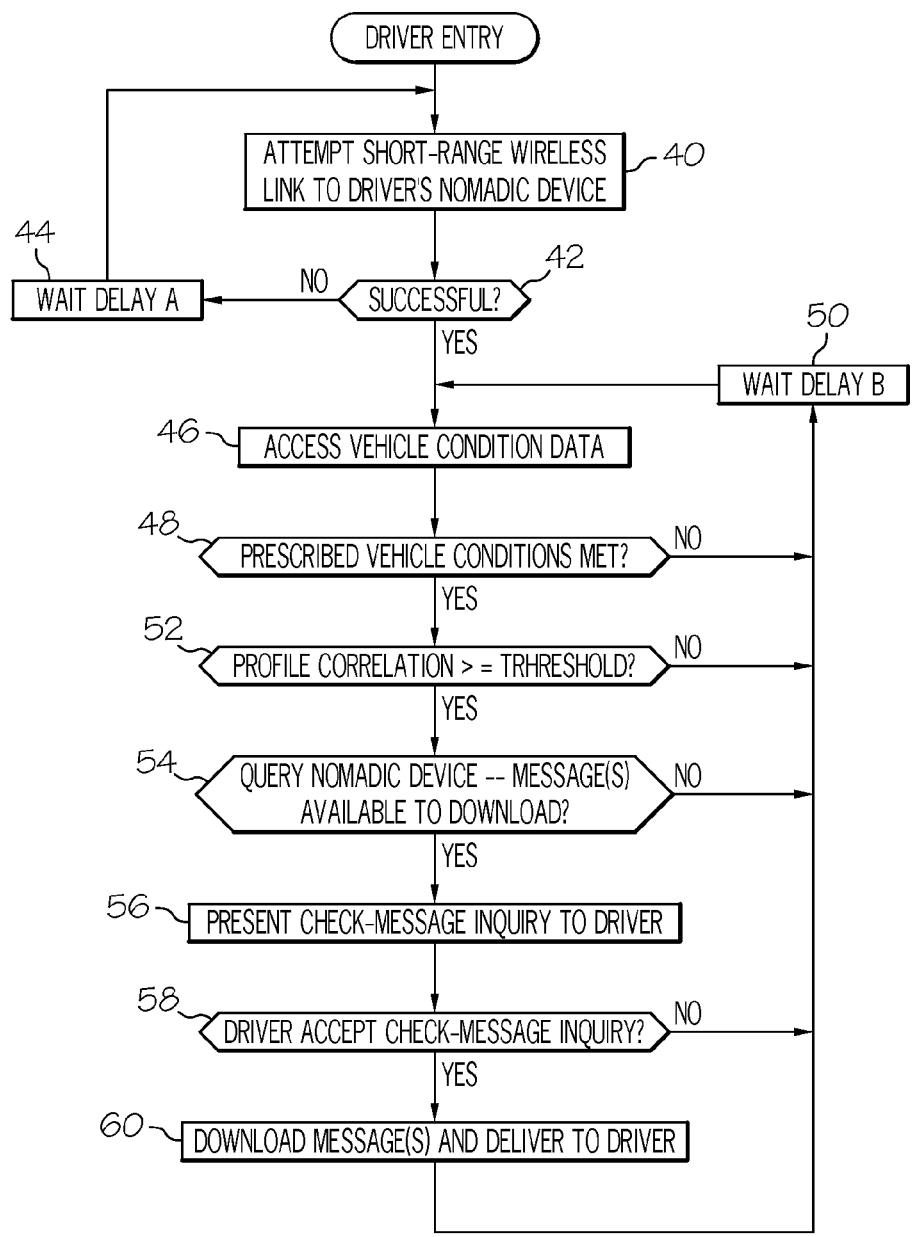
FIG. 2 is a flow diagram representative of a software routine executed by the microprocessor-based HMI-controller of FIG. 1 according to this invention.

Given the existence of a receptivity profile for a current driver 12, the flow diagram of FIG. 2 illustrates a decision path or matrix carried out by HMI-controller 24. Following driver entry into the vehicle, the blocks 40, 42 and 44 are iteratively executed until a short-range wireless communication link is established between nomadic communication device 14 and the wireless transceiver 18.

Once the short-range wireless communication link is established, the HMI-controller 24 executes blocks 46 and 48 to accesses vehicle system data via communication bus 38 and to determine if prescribed vehicle operating conditions are met. For example, the vehicle speed and/or transmission selector position may be acquired to verify that the vehicle is stopped. If the prescribed vehicle operating conditions are not met, the blocks 46 and 48 are re-executed following a delay interval, as designated by the block 50. However, if the prescribed vehicle operating conditions are met, block 52 is executed to determine if the driver 12 will likely be receptive to a check-message inquiry, based on current conditions and accumulated receptivity profile data. In the embodiment of FIG. 1, this determination is made based on a correlation value supplied to HMI-controller 24 by Correlation block 30, described below. If the correlation value indicates low driver receptivity to check-message inquiries, block 50 is executed to impose a delay interval before returning to block 46 and re-accessing vehicle operating condition data. However, if the profile correlation value indicates high driver receptivity to check-message inquiries, the HMI-controller 24 executes blocks 54 and 56 to determine if there is a phone message to download, and if so, to present a check-message inquiry to driver 12 via display 32. The blocks 58 and 60 then scan the input device 34 to determine if the driver 12 accepts the check-message inquiry, and if so, to download the message(s) for presentation to driver 12. Of course, if no messages are available to download or the driver fails to accept the check-message inquiry, the block 50 is executed as described above to impose a delay interval before returning to block 46 and re-accessing vehicle operating condition data.

Returning to the block diagram of FIG. 1, the Driver Model block 26 develops the driver receptivity profile by pairing driver acceptance of each check-message inquiry with the presence or absence of specified vehicle or temporal condition data at the time of the acceptance. The specified condition data may include, for example, the operating state of the vehicle audio system, the time between successively presented and accepted check-message inquiries, the noise level in the passenger compartment, time-of-day, ambient weather conditions (rain or fog, for example), the operating state of the nomadic communication device 14, presence of passengers in the vehicle, and so on. The Driver Model block 26 receives vehicle condition data via line 62, driver acceptance data via line 64, and temporal sensor data via line 66. Additionally, the Driver Routine Tracker block 28 may be employed to recognize certain common driver routines (such as listening to news during morning traffic) and provide an indication of the same to Driver Model block 26 via line 68. In effect, these recognized routines represent a complex set of conditions that may be relevant to driver receptivity to check-message inquiries. Other driver characteristics, such as driving aggressiveness, may be recognized by Driver Routine Tracker block 28 and used as an indication that check-message inquiries should not be presented.

Over time, the Driver Model block 26 thus accumulates data indicative of the tendency of the driver 12 to accept check-message inquiries presented via display 32. A given driver, for example, may exhibit a consistent tendency to accept check-message inquiries during operation of the vehicle audio system, but not when conversing with a passenger, and so on. Correlation block 30 designates an apparatus or process initiated when the prescribed vehicle operating conditions for check-message inquiry presentation are met, for evaluating a correlation between current conditions and Driver Model profile data paired with driver acceptance (or rejection) of check-message inquiries. The Correlation block 30 receives vehicle condition data via line 70, temporal sensor data via line 72, and receptivity profile data via line 74. The output of Correlation block 30 is a correlation value that is supplied to HMI-controller 24 via line 76. A high correlation value signifies high driver receptivity to check-message inquiries, while a low correlation value signifies low driver receptivity to check-message inquiries. The HMI-controller 24 evaluates the correlation value as described above in reference to flow diagram block 52 of FIG. 2.

In summary, the interactive nomadic phone message control apparatus of the present invention provides a way of allowing a vehicle driver to easily and safely check nomadic phone messages during operation of the vehicle. The HMI interaction with the driver is minimally invasive, and even adapts to suit driver message-listening preference by pairing driver acceptance with historical vehicle and temporal data and correlating current vehicle and temporal data with the historical data.

While the present invention has been described with respect to the illustrated embodiment, it is recognized that numerous modifications and variations in addition to those mentioned herein will occur to those skilled in the art. For example, the functionality of blocks 22-30 may be incorporated into HMI-controller 24, the apparatus 10 may be responsive to addition items of pertinent data that can be acquired or inferred, such as the location of the vehicle, ambient lighting conditions, indications of driver fatigue, and the time remaining for a traffic signal to change. Communication between HMI-controller 24 and nomadic device 14 can be viewed as a wired communication link as opposed to a wireless communication link. And certain of the parameters influencing the presentation of check message inquiries (vehicle location, vehicle speed, etc.) may be obtained or inferred from the GPS function of the nomadic communication device 14. Also, the apparatus 10 may be configured to allow the driver 12 to select predefined parameters such as a predefined message receptivity profile or a predefined minimum time interval between successive check-message inquiries, and so forth. Furthermore, a reduced functionality system may be applied to an existing vehicle by implementing the functionality of apparatus 10 in an RF-dongle, and plugging the dongle into the vehicle diagnostic port. Accordingly, it is intended that the invention not be limited to the disclosed embodiment, but that it have the full scope permitted by the language of the following claims.

The invention claimed is:

1. Interactive phone message control apparatus for a motor vehicle comprising:
 a communication link with a nomadic communication device carried by a driver of the vehicle when the driver is in the vehicle, the nomadic communication device having a message access function for retrieving text or voice messages sent to the driver;
 condition sensors for detecting vehicle operating conditions;
 a human-machine interface (HMI) including a configurable display apparatus selectively actuated to communicate a check-message inquiry to the driver, and an input device selectively manipulated by the driver to accept said check-message inquiry;
 a human-machine interface controller (HMI-controller) coupled to said communication link, said condition sensors and said HMI for sampling said condition sensors to identify prescribed vehicle operating conditions, actuating said configurable display apparatus to communicate said check-message inquiry when said prescribed vehicle operating conditions are identified, and activating said nomadic communication device via said communication link to retrieve said messages for presentation to the driver upon driver-manipulation of said input device to accept said check-message inquiry;

temporal condition sensors;

a driver model memory that stores historical data for a given driver, including temporal condition data in effect when the driver accepts said check-message inquires; and a correlator for correlating currently sensed temporal conditions with the temporal condition data stored in said driver model memory to develop an indication of driver receptivity to check-message inquiries under the currently sensed temporal conditions, and supplying the developed indication to said HMI-controller to conform the communication of said check-message inquiries to a historical preference of said given driver.

2. The interactive phone message control apparatus of claim 1, further comprising:

a short-range wireless transceiver for establishing said communication link with said nomadic communication device.

3. The interactive phone message control apparatus of claim 1, where:

said prescribed vehicle operating conditions include a condition of driver entry into said vehicle.

4. The interactive phone message control apparatus of claim 1, where said vehicle includes an audio system, and where:

said prescribed vehicle operating conditions include an operating condition of said audio system.

5. The interactive phone message control apparatus of claim 1, where:

said condition sensors include a microphone for sensing a noise level in a cabin of said vehicle.

6. The interactive phone message control apparatus of claim 1, where:

said prescribed vehicle operating conditions include a condition of vehicle idling for at least a predetermined interval.

7. The interactive phone message control apparatus of claim 1, where:

said HMI-controller acquires traffic signal data; and
said prescribed vehicle operating conditions include said traffic signal data.

8. The interactive phone message control apparatus of claim 1, where:

said prescribed vehicle operating conditions include a parameter that depends upon a state of charge of said nomadic communication device.

9. The interactive phone message control apparatus of claim 1, where:

said prescribed vehicle operating conditions include an operating condition of said nomadic communication device.

10. The interactive phone message control apparatus of claim 1, where:

said prescribed vehicle operating conditions include a parameter that depends upon a lapse of time since said HMI-controller last communicated a check-message inquiry to said HMI.

11. The interactive phone message control apparatus of claim 1, where:

said HMI-controller evaluates the detected vehicle operating conditions to determine a measure of driver aggressiveness; and
said prescribed vehicle operating conditions include the determined measure of driver aggressiveness.

12. The interactive phone message control apparatus of claim 1, where:

said vehicle operating conditions include an amplitude of vehicle vibrations.

13. The interactive phone message control apparatus of claim 1, where:

said vehicle operating conditions include an one or more parameters that depend on vehicle location or periodic samples of vehicle location.

14. The interactive phone message control apparatus of claim 13, where:

said condition sensor for detecting vehicle location is located in said nomadic communication device.

15. The interactive phone message control apparatus of claim 1, where:

said HMI-controller stores predefined profiles to govern the communication of check-message inquiries to said HMI when said prescribed vehicle operating conditions are identified; and
the driver selectively manipulates said input device to choose one of said predefined profiles.

16. The interactive phone message control apparatus of claim 1, where said vehicle includes an audio system, and where:

said historical data includes an operating condition of said audio system.

17. The interactive phone message control apparatus of claim 1, where:

said temporal condition sensors include a sensor for sensing a noise level in said vehicle; and
said historical data includes a parameter that depends upon the sensed noise level in said vehicle.

18. The interactive phone message control apparatus of claim 1, where:

said temporal condition sensors include a sensor for sensing presence of a front seat passenger in said vehicle; and
said historical data includes the sensed presence of a front-seat passenger.

* * * * *